Patented Mar. 10, 1925.

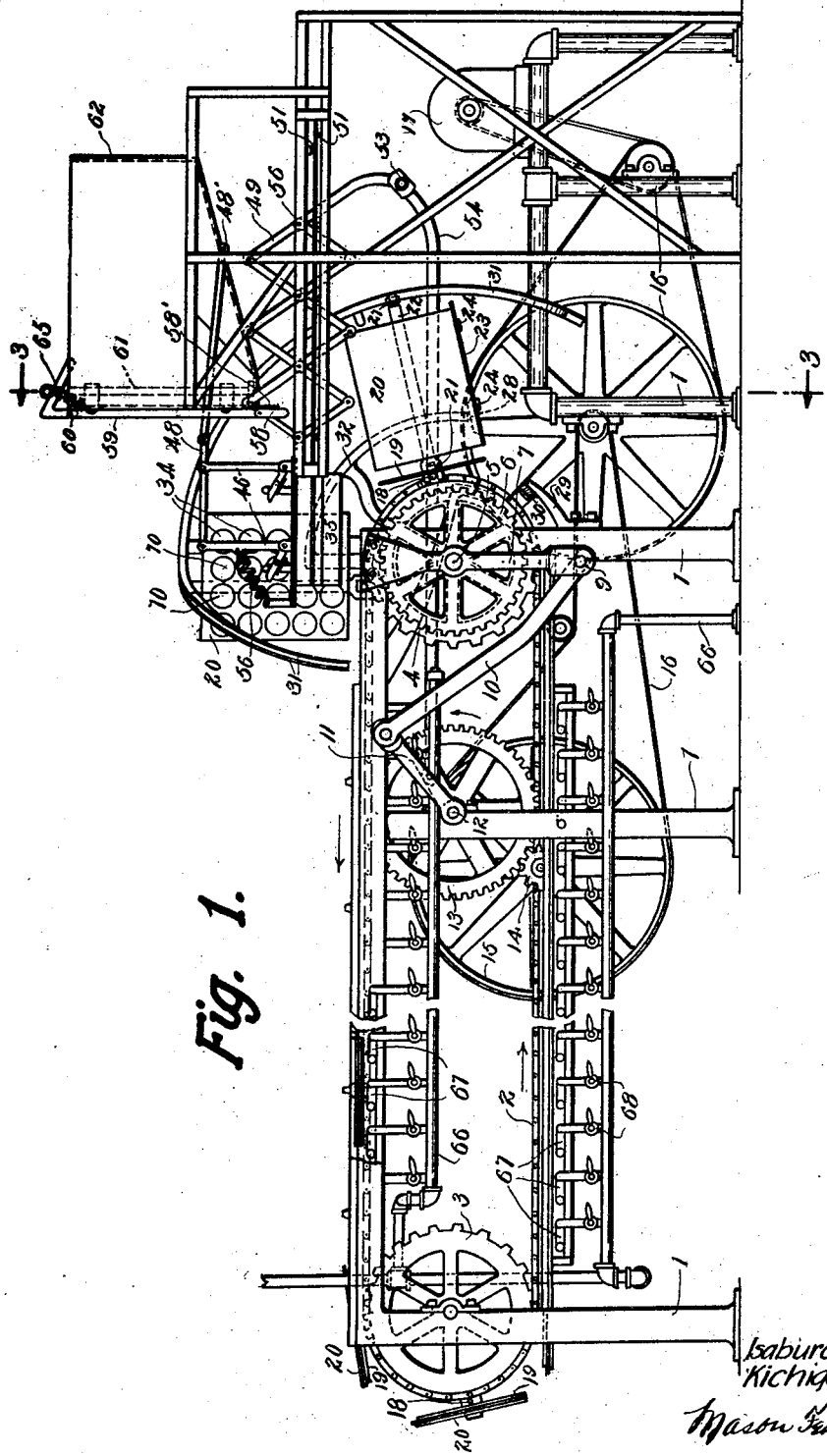

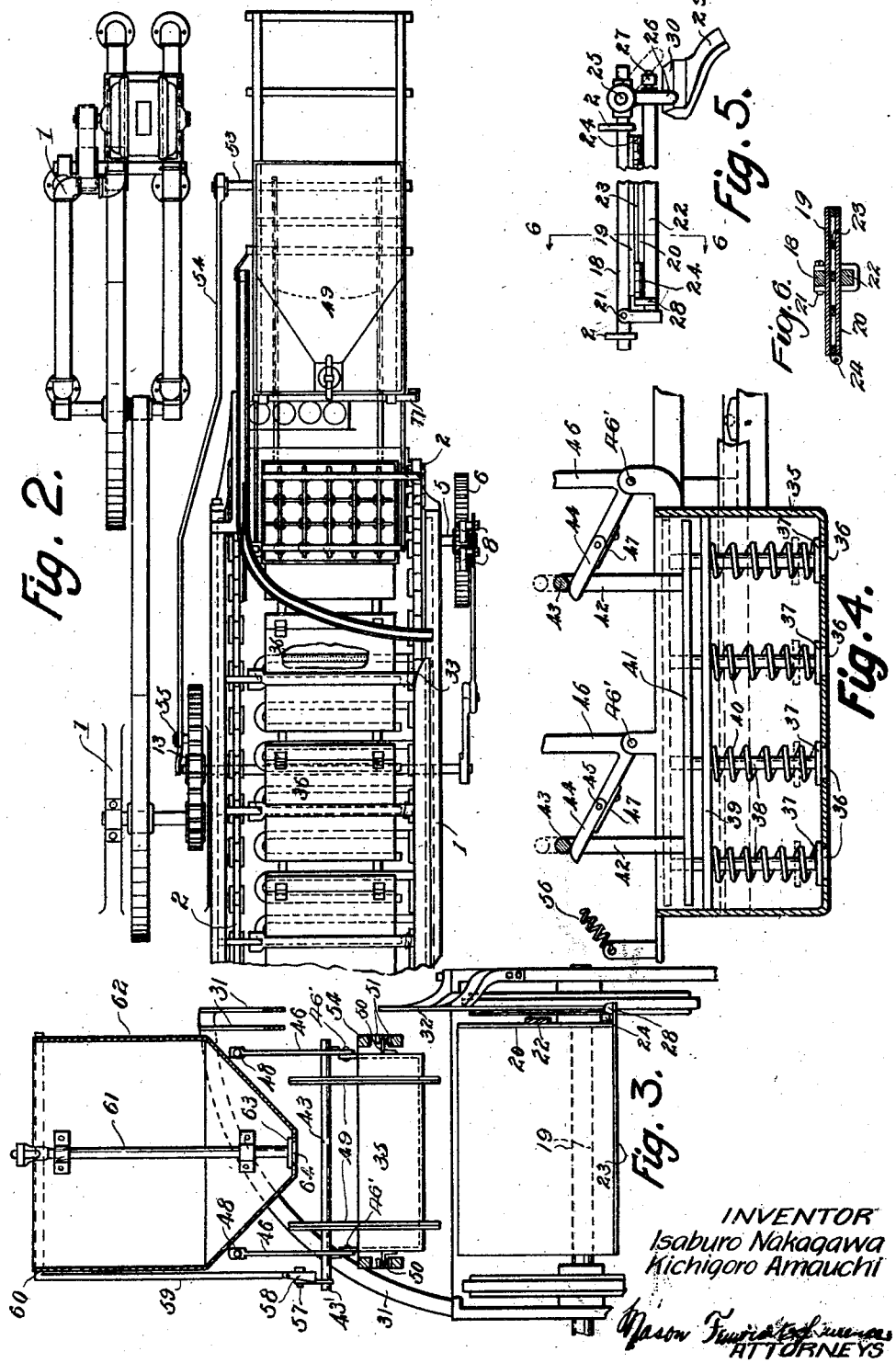

1,529,205

UNITED STATES PATENT OFFICE.

ISABURO NAKAGAWA AND KICHIGORO AMAUCHI, OF SEATTLE, WASHINGTON.

MACHINE FOR MAKING RICE CAKES.

Application filed June 2, 1923. Serial No. 643,102.

*To all whom it may concern:*

Be it known that we, ISABURO NAKAGAWA and KICHIGORO AMAUCHI, subjects of the Emperor of Japan, residing at Seattle, in the county of King and State of Washington, have invented certain new and useful Improvements in Machines for Making Rice Cakes; and we do hereby declare the following to be a full, clear, and exact description of the invention, such as will enable others skilled in the art to which it appertains to make and use the same.

This invention relates to machines for baking cakes, and more particularly rice cakes, and particularly to a machine by which the cake batter is automatically transferred from the hopper to the griddle and thereon baked, and afterward deposited in a suitable bin for packing, all without manual interference or assistance.

In the proper manufacture and baking of rice cakes it is necessary that a thin batter be used and the cakes formed and cooked in a thin sheet of any suitable size, but usually of circular form and approximately three inches in diameter and less than a quarter of an inch thick. The heat must be applied to both top and bottom of the cakes, and the cake enclosed in a tight compartment of its own size to insure the even cooking thereof and to hold the batter in true form until the mass is fully cooked.

Heretofore these cakes have been cooked with hand tools with imperfect results, but our invention will enable the manufacture of large quantities of cakes by a continuous operation, substantially automatic in character, and with the production of a perfectly cooked product.

The invention consists in the novel improvements in the griddle structure as well as novel improvements in the assembly of the plurality of griddle elements, with means for automatically operating the same, supplying batter thereto and removing the cooked cakes therefrom, as will more particularly appear in the course of the following description.

Two sheets of drawings accompany this specification as part thereof, in which like reference characters indicate similar parts throughout.

In the drawings, which are largely diagrammatic,—

Figure 1 is a side elevation showing our entire machine;

Fig. 2 is a plan view of the machine partly broken away;

Fig. 3 is a transverse sectional view taken on the line 3—3 of Figure 1;

Fig. 4 is a detail longitudinal vertical cross sectional view through the batter distributing device;

Fig. 5 is a back elevational view of a single griddle unit; and

Fig. 6 is a transverse sectional view taken on the line 6—6 of Fig. 5.

In accordance with the present invention a suitable frame 1 is provided, adapted to support two horizontally disposed and laterally spaced endless chains 2—2, which are passed at the front end of the machine over suitable freely rotatable gear wheels 3—3, and at the rear upon suitable gear wheels 4—4 fixedly mounted upon transverse shaft 5.

The chains 2—2 are connected by a plurality of laterally disposed rods 18 upon which are secured the griddle units hereinafter more particularly described.

On the shaft 5 is also secured the gear wheel 6 and a freely rotatable lever 7, the lever 7 being provided adjacent its upper end with pawls 8 adapted to engage the teeth of gear 6, and being pivotally connected at its lower end with the connecting rod 10 which is in turn pivotally connected with lever 11 secured to transverse shaft 12, upon which is mounted a gear 13, which gear 13 is operated through a spur gear 14 rotated by means of pulley 15 and any suitable power transmission means such as is illustrated by belts 16 from a motor 17.

From the structure thus described it will be apparent that the motor 17 will operate gear 13 and shaft 12, thus causing lever 7 to rotate chains 2—2 in the direction indicated by the arrows (Figure 1) by short successive steps.

The improved griddles which are secured upon the endless chains 2—2 in any suitable number each consist of an inner griddle 19 fixedly secured to one of the transverse rods 18, an intermediate griddle 23 and an outer griddle 20. The outer griddle 20 is secured to a transverse rod 22 which is hinged at one end as at 21 to the transverse rod 18. The other end of rod 22 is provided with a suitable roller 27.

On the end of rod 18 above the free end of rod 22 is pivoted a U-shaped latch 26 adapted to engage the end of rod 22 to hold the griddles in assembled relation. The intermediate griddle 23 is hinged as at 24—24 to the rear edge of outer griddle 20 and is provided with a downwardly extending lug 28.

Secured to a suitable part of the frame 1 adjacent the rear end of chains 2—2 is a bracket 29 provided with an angularly disposed cam face 30 positioned in such manner that in the passage of the griddle past said cam face the cam will engage link 26 and force same downwardly to release rod 22 and permit said rod with the outer griddle 20 to drop open swinging upon its pivot 21.

The frame 1 further supports two spaced guide members 31 positioned back of chains 2—2 and extending upwardly arcuately and thence transversely of the machine as is well illustrated in Figs. 1 and 3.

The roller 27 on the end of rod 22 is adapted to be engaged between these two spaced guide members 31 so as to retain the rod 22 in its open position during the passage of the griddle upwardly over gear wheels 4—4.

A second guide member 32 is mounted upon the frame 1 in such manner that as the griddles ascend over the gears 4—4, lug 28 extending backwardly behind the griddle 20, will engage the guide 32 which will force griddle 23 into its closed position in contact with the inner face of griddle 20 in the position indicated at the top of Fig. 1.

By reason of the extension of guides 31—31 transversely of the machine above gears 4—4, it will be apparent that as the chains 2—2 carry the griddle forward from this position the outer and intermediate griddles will be carried downwardly into closed position in contact with the inner griddle 19.

A second cam 33 is provided adjacent the end of guides 31 adapted to engage link 26 and to force same again into locking position with rod 22 thus securely fastening the griddles together.

The intermediate griddle 23 above referred to is provided with a plurality of spaced holes 70, each of the size of the rice cake to be cooked, and is constructed of material of the thickness of the finished product. If desired, and to facilitate the removal of the cakes, the edges of these holes 70 may be beveled outwardly.

To convey the batter to the griddles a reciprocating receptacle 35 is provided carried upon guide members 52 and supported thereon as by angle members 51 and rollers 50 disposed below and above the horizontal flanges of the angle members. This distributor is provided with a plurality of holes 36 in its bottom corresponding to and spaced similarly to the holes 70 in the intermediate griddle 23. Each of the passages 36 is controlled by a valve head 37 mounted upon a spindle 38 guided through suitable holes in a supporting member 39 secured to the receptacle 35, the valve stems 38 being secured in rows to transverse rods 41 which are in turn connected as by vertical members 42 and rollers 43 with bell levers 46 pivoted as at 46' to the sides of receptacle 35.

The immediate contact of rollers 43 is with a latch 44 pivotally mounted as at 45 upon an arm of the bell lever 46, which latch is secured against downward movement by a back plate 47 as illustrated in Fig. 4, thus permitting levers 46 to be rocked to pass latches 44 beyond rollers 43 and then resume their original positions. Compression springs 40 are positioned around spindle 38 and intermediate members 37 and guide members 39 so as to normally force the valve heads 37 to close passages 36.

The upper ends of bell levers 46 are pivotally secured to a connecting rod 48 suitably pivoted as at 48' to the frame of the machine. The upper arm of one of each series of bell levers 46 is secured as by a spring 56 to the forward end of the container 35, said spring operating to normally pull bell levers 46 forwardly to position catchers 44 beneath rollers 43 so that on the forward movement of the container 35 the upper arms of bell levers 46 being held backward by means of connecting rod 48, the catches 44 will be raised, thus lifting valves 37 at substantially the forward limit of the movement of container 35 opening at that point the passages 36 for the discharge of batter from the container upon the lower griddle of the griddle unit positioned above the gear wheels 4—4.

To the rear of container 35 are attached the forward ends of two pairs of lazy tongs 49, the rear ends of which are pivoted as at 56 to the frame 1. The upper rear members of the lazy tongs 49—49 are extended downwardly to constitute levers secured to a transverse shaft 53, to which in turn is secured a lever 54 extending forwardly and eccentrically pivoted by a suitable slot connection as at 55 to gear 13.

By reason of this structure it will be apparent that the rotation of gear 13 will operate concurrently with the rotation of chains 2—2 to swing lever 54 and thus through the lever connection with the lazy tongs 49—49 operate to successively extend and retract said tongs to reciprocate the batter dispensing container 35.

Mounted upon the frame 1 and to the rear of gears 4—4 and substantially above the rearmost position taken by batter distributing container 35 is a batter reservoir 62 provided in its bottom adjacent its forward end with a passage 64 controlled by a valve 63 secured to a vertically extending valve stem 61, which valve stem is normally held depressed by a suitable spring 65 connected thereto and with the reservoir 62. The valve stem 61 is provided at its top with a suitable transverse roller adapted to be engaged by a bell lever 59 pivoted to reservoir 62 as at 60, one arm of which extends downwardly and is provided with latch 58 pivoted thereto but secured against rocking backwardly by a back plate 58'. One of the transverse rods 43 operative of the valves in the batter distributing receptacle 35 and preferably the forward rod, is extended to one side of the receptacle as at 43' in such manner that on the rearward movement of the receptacle 35 when the receptacle is under the discharge passage 64 of the reservoir 62, it will contact latch 58 thus rocking bell lever 59 and lifting valve 63 to permit the discharge of the batter from the reservoir 62 into the distributing receptacle 35, thus replenishing the supply of batter in said receptacle.

As illustrated, the baking is done by gas fuel which is supplied through the pipe 66 and a plurality of burners 67 which, as shown, are substantially U-shaped pipes provided on their upper face with numerous spaced gas outlets.

These burners are arranged parallel and under both the upper and lower horizontal stretches of the chains 2—2, as is illustrated in Fig. 1. Suitable valves 68 are provided one for each burner unit so that the heat may be regulated as desired at all points in the passage of the griddles over the machine.

In operation the burners are lighted and adjusted to a proper heat and the reservoir 62 is filled with a suitable batter. Upon starting the motor 17 shaft 12 will be rotated, thus operating lever 11 and gear 13. The rotation of lever 11 will as previously described cause chains 2—2 to move in the direction indicated by the arrows in Fig. 1, the griddle on the lower stretch of the chains 2—2 nearest gears 4—4 will advance upwardly until cam 30 on bracket 29 engages link 26 and removes same from its locking position, thus permitting griddle rod 22 to drop, and at the same time intermediate griddle 23 will also drop by reason of its hinged relation to the lower edge of the outer griddle 20, the shock of the intermediate griddle upon the termination of its fall being such as to knock from the holes 70 the rice cakes therein. Any suitable receptacle may be positioned under the machine at this point (not shown) to receive the cooked cakes.

The griddle continuing its upward course over gears 4—4 has its roller 27 first engaged by the guides 31—31 and then the lug 24' upon the intermediate griddle 23 contacts guide 32 which forces the intermediate griddle into closed relation with the outer griddle 20 which is maintained in its open position by means of guides 31—31. As the griddle reaches the upper position above gears 4—4, batter distributing receptacle 35 operated by lazy tongs 49—49 operated by lever 54 from gear 13 has reached its forward position above the griddle, and by reason of its forward motion rocks lever arms 46 thus lifting valves 37 to permit of the simultaneous discharge of a plurality of spaced dabs of batter upon the inner griddle 19. This particular griddle is next advanced by a periodic motion of the chains 2—2, the guides 31—31 extending at this point transversely and obliquely of the machine guide the roller 26 downwardly to close the intermediate and outer griddles upon the inner griddle so that the holes 70 of the intermediate griddle receive each a dab of batter previously disposed upon the lower griddle corresponding thereto. As this griddle further progresses toward the front of the machine the link 26 comes into contact with cam 33 and is forced into locking engagement with rod 22 of the griddle, thus securing the griddle parts together. In the further progress of this griddle from this position to the point at which the description of the operation commenced, it will be apparent that the inner griddle will be first heated by the burners positioned under the upper stretch of the chains while the outer griddle will in turn be heated by the burners positioned under the lower stretch of the chains, thus assuring the proper baking of the cakes from both sides.

Immediately following the discharge of the batter from receptacle 35 upon one griddle the lazy tongs 49—49 operate to retract distributing receptacle 35 to its rearmost position under the reservoir 62, at the conclusion of which rearward movement of the receptacle 35 as previously described the extended rod 43 contacts latch 58 to operate the valve 63 in the reservoir and thus replenish the supply of batter in the distributing receptacle in time for its return to its forward position to repeat the previously described operation in connection with the next adjacent griddle then arrived in position.

Various modifications in the precise form, structure and arrangement of the mechanism will readily suggest themselves to those skilled in the art, but within the scope of the present invention as claimed.

Having thus fully described my invention, we claim:

1. In a machine for cooking rice cakes the combination of a batter supply reservoir and means for opening and closing a discharge mouth therefrom, a reciprocating batter pan for transferring a supply of batter from the reservoir to the baking griddles, means for operating the reciprocating pan and means for opening and closing discharge outlets in the bottom of the pan; a plurality of baking griddle plates attached to spaced sprocket chains operated over sprockets, and means for operating the sprockets intermittently, a duplicate set of baking griddle plates pivoted at one end to one end of the respective fixed plates, with means for holding the unhinged end of the plates together, and means for releasing the said holding means at predetermined positions, a third forming griddle plate mounted by hinge connection on the pivoted baking griddle plate, and means for folding the forming griddle plate between the outer baking griddle plates, and means for heating the griddle plates from both sides as they are moved by the sprockets and chains.

2. In a machine for cooking rice cakes with a plurality of griddle plates affixed to an endless conveyor, a duplicate set of baking griddle plates pivoted each at one end to one end of the fixed plates forming griddle plates, pivotally mounted one intermediate each fixed end pivoted plates, and means for holding the free end of the pivoted duplicate plate in a predetermined position abutting the fixed plate with a forming griddle plate between the baking plates, and means for releasing the holding means, with means for holding the pivoted plates and forming plates opened from against the fixed plates for predetermined periods, and means for closing the pivoted and forming plates down and against the fixed plates, means for placing cake batter upon the fixed plate while the moving plates are held open therefrom, and means for operating said conveyor and batter depositing means in predetermined sequence.

3. In a machine for cooking rice cakes the combination of a griddle unit comprising an outer griddle, an inner griddle and an intermediate griddle, the outer griddle pivoted adjacent one end with relation to the inner griddle, the intermediate griddle hinged adjacent one edge to the outer griddle, means for conveying the griddle unit by successive steps in a rotary circuit, means for automatically securing the parts of the griddle unit together operative at one point in the circuit, means for automatically releasing the parts of the griddle unit at another point in the circuit, means for holding the parts of the griddle in a predetermined relation intermediate the aforementioned points in the circuit, and means for automatically supplying batter to predetermined positions on one of the griddle parts.

In testimony whereof we affix our signatures.

ISABURO NAKAGAWA.
KICHIGORO AMAUCHI.